Patented Mar. 5, 1929.

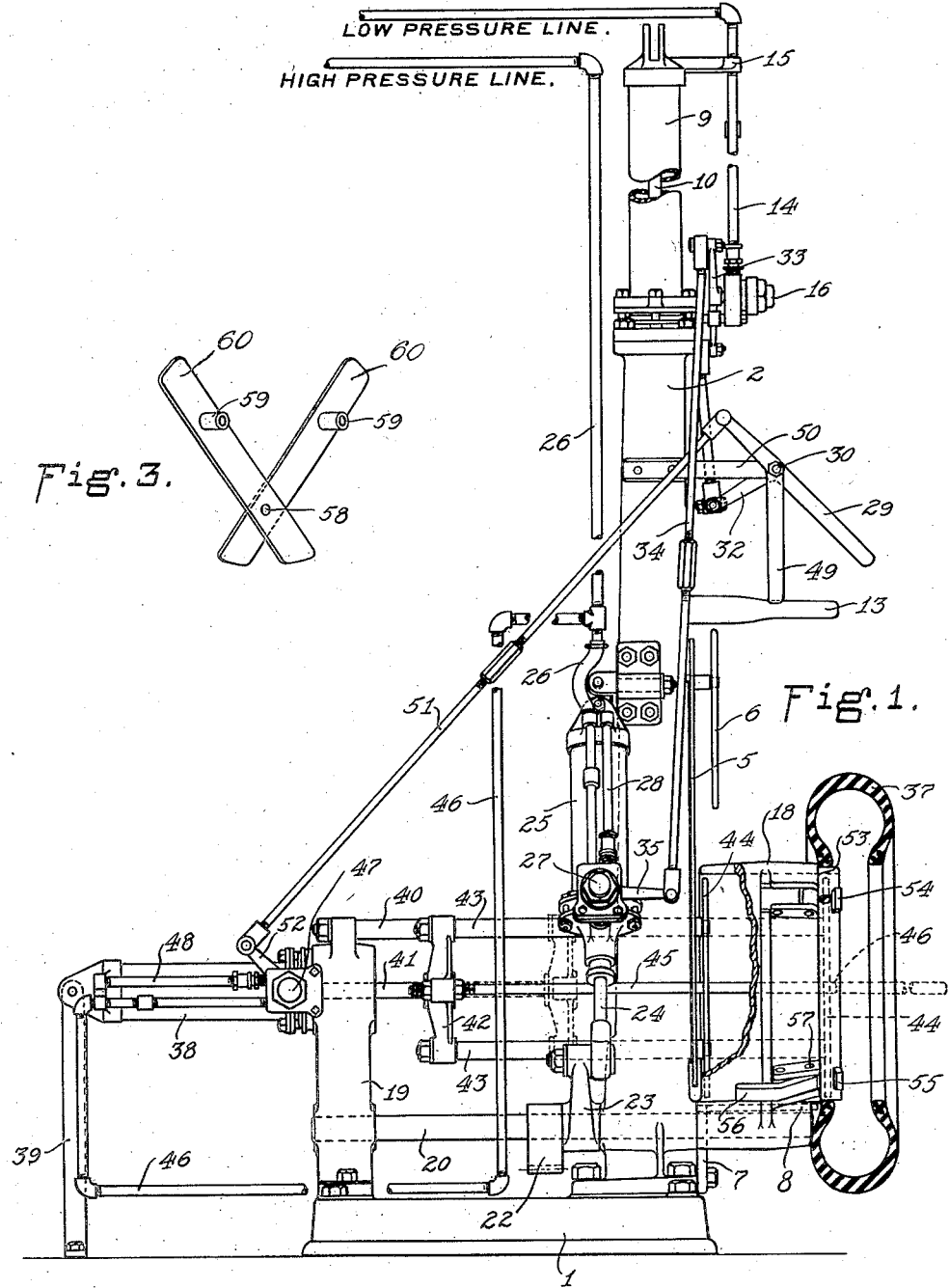

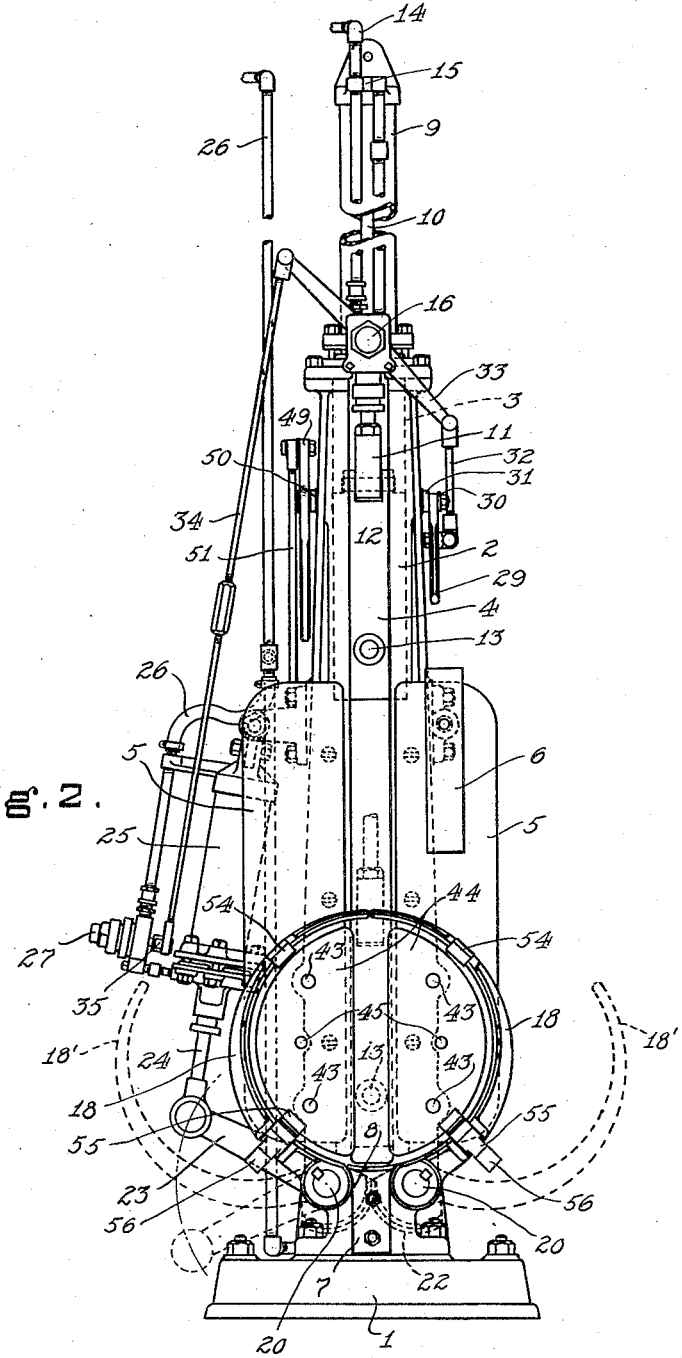

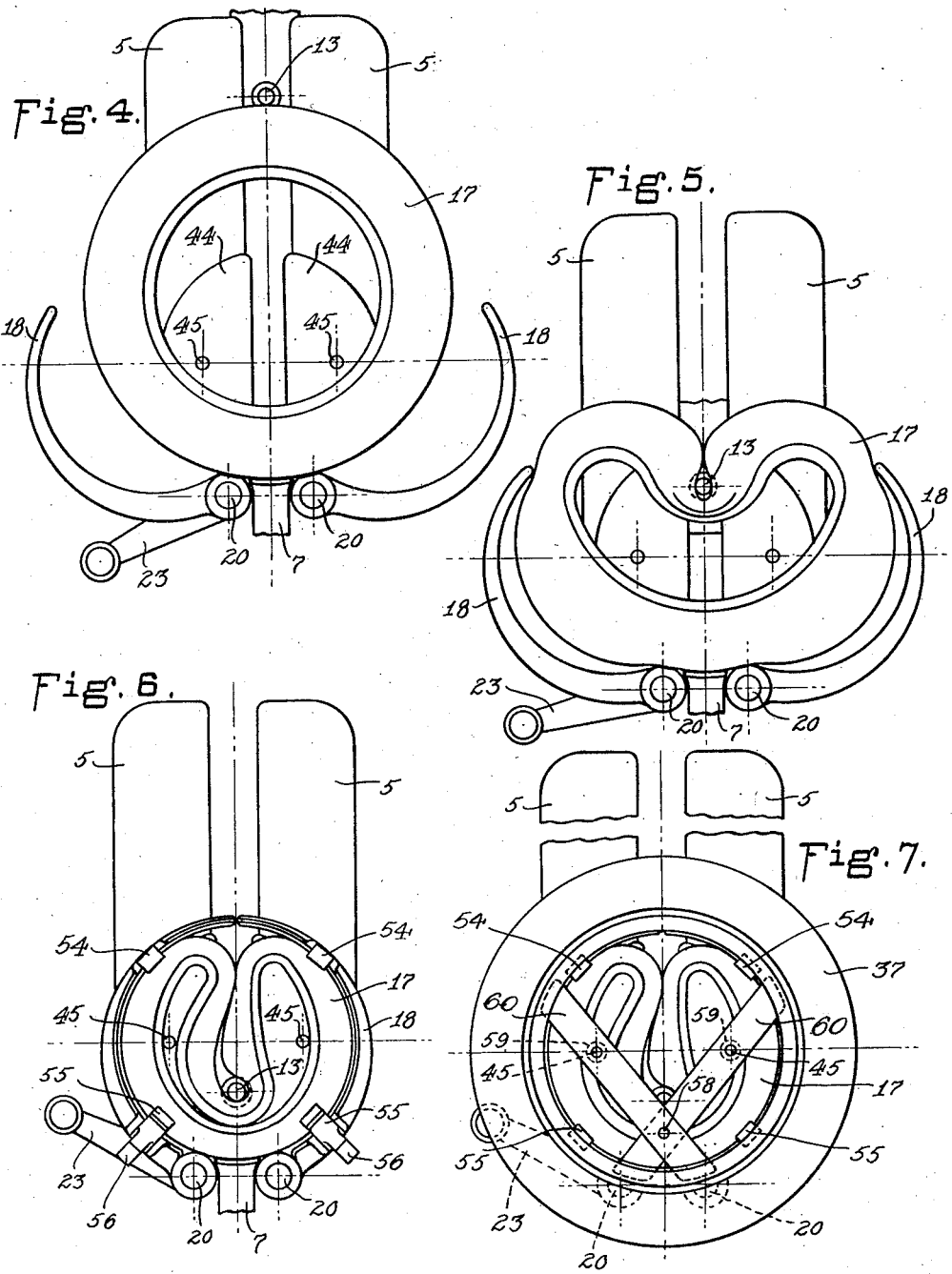

1,703,918

UNITED STATES PATENT OFFICE.

ADRIAN OREN ABBOTT, JR., OF DETROIT, MICHIGAN, ASSIGNOR TO MORGAN & WRIGHT, OF DETROIT, MICHIGAN, A CORPORATION OF MICHIGAN.

MACHINE AND METHOD FOR ASSEMBLING CURING BAGS IN TIRE CASINGS.

Application filed August 21, 1926. Serial No. 130,674.

This invention relates to the assembling of curing bags in tire casings. More particularly it relates to a method and means for assembling curing bags in tire casings by mechanical means.

As the practice of assembling curing bags on tire casings has previously been carried out, the machines have been used to fold the curing bag by means of a number of radial arms which work from the circumference of the bag inwardly folding it in a number of loops. The tire casing is then passed by hand around the bag while held folded. Handling the casings in this way requires a great expenditure of energy both for raising them from the floor and positioning them on the bag and for spreading the beads of the casing. In the case of large size tires, the present methods are especially unsatisfactory since the bag, even when folded in the manner described above, is too large to permit of the passage of the casing around it without the exercise of considerable pressure.

An object of this invention is to provide an improved apparatus for assembling curing bags in tire casings.

Another object is to provide an apparatus adapted to spread the beads of a tire casing while presenting a curing bag for insertion within the tire casing.

Still another object is to provide an apparatus which will be simple to operate and by which the process of assembling curing bags in tire casings can be carried on more rapidly than has hitherto been possible and without injury to the bag.

A further object is to provide a simple and rapid method of assembling curing bags in tire casings.

For a detailed disclosure of the nature and objects of the invention, reference is had to the accompanying specification and drawings in which latter:

Fig. 1 presents a side elevation of a complete machine;

Fig. 2 is a front elevation of the machine;

Fig. 3 is a perspective view of a cross bar apparatus for spreading the beads of the tire casing;

Fig. 4 is a partial front elevation showing the curing bag in position for folding;

Fig. 5 is a partial front elevation showing the curing bag partially folded;

Fig. 6 is a partial front elevation showing the curing bag completely folded; and Fig. 7 is a partial front elevation showing the tire in position on the machine just prior to placing the curing bag therein.

Referring to the drawings, the apparatus comprises a base 1 upon the forward portion of which is rigidly mounted a frame 2. This frame contains a recess 3 shown in dotted lines in Fig. 2 extending from top to base of the frame, which recess is provided with a smooth bore suitable to serve as a guide and runway for a slide 4. A slot of less width than the recess extends from the recess through the walls of the frame throughout the entire length of the recess. Face plates 5 are mounted upon the frame 2 at each side of the slot and secured to one of these plates is a guide 6 designed to aid in positioning the air bags properly on the machine. A bracket 7 is mounted upon the frame 2 and carries a horizontally extending portion 8 which acts as a support for the curing bag 17. Rigidly secured in vertical position to the top of the frame is a fluid pressure cylinder 9 in which is adapted to be actuated a piston rod 10 which carries at its lower end a yoke 11 to which is secured the slide 12. The slide 12 is of a suitable size to fit the bore of the recess 3 in sliding engagement. The slide carries a projecting arm 13 extending outwardly through the slot at right angles to the slide 12. The slide 12 is actuated by the fluid pressure cylinder 9 to reciprocate up and down in the recess 3 throughout substantially the length of the recess. This reciprocating movement is caused by fluid pressure introduced into the cylinder 9 from pipe line 14. This pipe line is supported on the cylinder by a brace 15 and connects with the cylinder at its base through a valve 16. The position of the slide 12 and arm 13 when in the lowermost end of the recess is shown in dotted lines in Fig. 2. The function of the fluid pressure is to raise the piston head (not shown) of the cylinder 9, thereby elevating the slide 12 with its arm 13 to a position such that the air bag represented by 17 can be inserted between the supporting arms 18. Since the amount of work necessary to lift the piston head is relatively small, the fluid can be maintained at a low pressure in pipe line 14.

The base 1 carries rigidly secured at its rear portion a second supporting frame 19. Mounted horizontally upon the two frames 2 and 19 for rotary movement thereupon are two shafts 20 which carry rigidly upon their outer ends semi-circular arms 18. These arms 18 are to constitute a holder for the air bag 17 both during and subsequent to the folding operation. The arms 18 are adapted to pivot with the shafts 20 as axes from the open position shown in dotted lines in Fig. 2 in which they are designated 18' to the closed position shown in full lines in the same figure. Rigidly secured on the shafts 20 are the cooperating segmental gears 22, the teeth of which interengage for cooperative movement. Connection with a source of power for the shafts 20 is through a lever 23 which is rigidly secured to one of the shafts. This lever is pivotally engaged with a piston rod 24 which extends into the air pressure cylinder 25. This cylinder 25 is rigidly secured to the frame 2. The fluid under pressure is introduced from a pipe line 26 which connects with the cylinder 25 at its base through a two-way valve 27 and at its top through a by-pass 28. The energy necessary to operate the piston rod 24 is relatively great and fluid under comparatively high pressure is used in the pipe line 26. The position of the arms 18 prior to receiving the air bag is that shown in dotted lines in Fig. 2.

The apparatus previously described is designed to fold ring shaped flexible pneumatic cores. Actuation of the apparatus is effected through hand lever 29 which is pivotally mounted at 30 on a bracket 31, (see Fig. 2) rigidly fixed to the frame 2. An arm 32 is pivotally attached at one end to the lever 29 and at its other end to a rod 33 which by pivotal movement will open and close the valve 16. The portion of rod 33 which extends beyond the valve 16 is pivotally attached to link 34 which in turn is pivoted to crank arm 35 which actuates valve 27.

After the air bag has been folded and clamped by means of the apparatus above described, the bag 17 is pushed from the clamping arms 18 into the tire casing designated by numeral 37. Rigidly secured to the frame 19 in horizontal position is a fluid pressure cylinder 38. The cylinder is braced in position by a supporting arm 39 which bears against the floor or other member upon which the base 1 is placed. A further supporting member 40 connects the frame 19 with the frame 2. A piston rod 41 extends from cylinder 38 and carries at its outer end a yoke 42 carrying two pairs of rods 43 which pass through the frame 2 in slidable engagement therewith. Each vertical pair of rods 43 carries rigidly secured to their outer ends, a plate 44. These plates 44 are designed to press against the folded bag 17 during the outward stroke of the piston rod 41 and to force it into position opposite the tire casing 37. Rigidly attached to the yoke 42 and extending outwardly therefrom in parallel relation to the rods 43 and extending through the plates 44 are two arms 45 which are so positioned that they lie adjacent the inner periphery of the air bag 17 and aid in the process of folding the air bag by serving as guides to distribute the bag evenly so that the arms 18 can enfold the same with the least possible resistance. The position of the yoke 42 and plates 44 at the beginning of their outward stroke is that shown in full lines in Fig. 1. In this position the arms 45 extend through the plates and terminate at the point shown in dotted lines and designated as 46. The position of the yoke 42, plates 44 and arms 45 at the outer end of their stroke is shown in dotted lines in Fig. 1. Fluid pressure is applied to the cylinder 38 through a pipe 46 which branches off from pipe 26 and connects with the base of the cylinder 38. A two way valve 47 is attached to the pipe 46 at its connection with the cylinder 38 and connects with a by-pass 48 which opens into the head of the cylinder. By means of this two-way valve fluid under pressure can be introduced on either side of the piston head (not shown). Actuation of the piston head is effected through a hand lever 49 pivoted on a bracket 50 rigidly secured to the frame 2 on the other side of the groove from the bracket 29. This hand lever 49 is pivotally connected with rod 51 which in turn is pivoted to crank 52 which actuates the two way valve 47 to introduce fluid under pressure in either end of the cylinder 38. The arms 18 which clamp the air bag 17 are so shaped that when in closed position they form a cylinder The outer edges of the arms 18 are reduced to form an annular shoulder 53 and the reduced portion of the arms when closed forms a ring of slightly less outside diameter than that of the tire casing 37. Ribs 54 are positioned rigidly upon the upper side of the outer edge of the reduced portion to constitute retaining hooks for a tire casing slipped thereon. Hingedly connected to the lower portion of the arms 18 are latches 55 having a weighted end 56 pivoted to the arms 18 by pintle 57. At the time the tire casing is being mounted on the circular arms, the latches 55 have been swung out of latching engagement by reason of the weighted arms 56. During the process of pushing the folded air bag 17 through the cylinder formed by the arms into the tire casing, the latches 55 are pushed forward by the air bag and engage the edge of the inner bead of the casing holding it in place on the reduced portion of the cylinder until the air bag has been pushed into position. This being accomplished, the weighted latches 55 will again swing into unlatched position.

In utilizing the apparatus to insert an air bag into a tire casing, the hand lever 29 is operated to open the valve 16 allowing fluid under pressure to be admitted into cylinder 9 and force the piston 10 with arm 13 to their upper position. At the same time by the train of connections previously described, the valve 36 is opened to permit fluid under pressure to force the piston head and piston 24 of cylinder 25 downwardly and thereby spread open the arms 18 to the position shown in dotted lines in Fig. 2 or in full lines in Fig. 4. A curing bag is now manually inserted between the arms 18 as shown in Fig. 4. Further pressure of the hand lever 29 closes the valve 16 thus withdrawing the pressure on the piston head of cylinder 9 and permitting settling of the same with the arm 13 connected thereto by force of gravity. As it settles, it presses the curing bag downwardly through the successive positions shown in Figs. 5 and 6 during which it folds the curing bag about itself.

By the same movement of the hand lever 29, the valve 36 has been actuated to introduce fluid under pressure into the base of the cylinder 25 thereby elevating the piston head and closing the arms 18 connected thereto as previously described. During this procedure the arms 18 pass through the successive stages illustrated in Figs. 4, 5 and 6 and their movement is actuated in timed relation to the movement of the arm 13 so that the three elements cooperate to fold the bag in cylindrical form and at the same time to inclose it. During this process the arms 45 have aided in holding the air bag in position.

Upon the completion of this operation the tire casing 37 is placed over the lugs 54 upon the reduced portion of the cylinder formed by the closed arms 18. Hand lever 49 is now actuated to manipulate the valve 47 whereby fluid under pressure is introduced at the outer end of the cylinder 38 to force the piston head with the plates 44 connected thereto in the outward stroke. In this way the plates 44 press against the folded air bag and force it outwardly. As the air bag slides through the cylinder formed by the arms 18 it presses the latch members 55 inwardly whereby they secure the lower portion of the tire casing in place. The plates 44 are carried outwardly until they reach the dotted line position shown in Fig. 1. At this point the air bag has been forced beyond the cylinder and now tends to spring back into tire form by it own elasticity to its normal position entering the tire casing at the same time.

As a means of insuring that the toes of the tire casing are spread apart sufficiently to permit automatic expansion of the air bag into place therein, there can be utilized the device illustrated in Figs. 3 and 7. This device comprises two flat bars 60 pivotally connected at a point 58 adjacent their ends. Each bar carries a cylindrical projection 59 of a suitable size to telescope over the ends of rods 45. In using the cross bars 60 they are placed between the tire beads and spread into position with the sleeves 59 telescoping over the ends of the rods 45. As the air bag is forced outwardly during the forward stroke of the yoke 42, it presses against the cross bars 60 forcing the beads of the casing apart. With the beads in spread position, the air bag is free to spring of its own resilience into position in the casing.

There has been devised by the apparatus described a simple and effective way of assembling curing bags in tire casings by automatic means. The manual labor of positioning the tire casing over the folded curing bag has been eliminated.

The operation of the device is rapid and is not injurious to the curing bag.

Having thus described my invention, what I claim and desire to protect by Letters Patent is:

1. In a device of the class described, in combination, jaws adapted to receive a curing bag, pressing means adapted to be moved to fold the curing bag, means for actuating the pressing means, means for operating the jaws to clamp and compress the curing bag, an expellor for forcing the curing bag out of engagement with the jaws, and an actuator for the expellor.

2. In a device of the class described, in combination, jaws adapted to receive a curing bag, a movable member adapted to fold the curing bag, means for actuating the movable member, means for operating the jaws to embrace and compress the curing bag, supports carried by the jaws adapted to receive a tire casing, and an expellor for forcing the air bag from the jaws to a position within the tire casing, and actuating means for the expellor.

3. In a device of the class described, in combination, cooperating jaws adapted to receive a curing bag, a movable member adapted to fold the curing bag, means for actuating the movable member, means for actuating the jaws to enfold the curing bag, guide means projecting between the jaws to distribute the curing bag evenly while it is being folded, supports associated with the jaws for receiving a tire casing, an expellor for withdrawing the curing bag from the enfolding arms and applying it to the tire casing, and driving means for the expellor.

4. In a device of the class described, in combination, a support adapted to receive a folded curing bag, locking means for attaching one of the beads of a previously shaped tire casing to the support, an expellor for forcing the folded curing bag from the support to a position opposite the tire casing, and a member adapted to be pressed during movement of the expellor against the other and free bead of the tire casing whereby the casing beads are spread apart and the curing bag is permitted to spring into place within the casing.

5. In a device of the class described, in combination, a means adapted to enclose and compress a folded ringshaped bag, a support mounted upon the means adapted to carry a previously shaped tire casing in non-registering position with respect to the bag, an expellor adapted to force the folded bag from the means to a position in registration with the tire casing whereby the bag can spring into its normal shape and into nested relation with the tire casing, and means for actuating the expellor.

6. In a device of the class described, in combination, means adapted to fold a curing bag, an actuator for the means, a support adapted to carry a previously shaped tire casing in a non-registering position with respect to the folded bag, an expellor for the folded curing bag, and means for actuating the expellor whereby the bag is expelled bodily from the folding means to a position in registration with the tire casing whereby it can spring into its normal shape within the tire casing.

7. In a device of the class described, in combination, a member for collapsing a curing bag into a folded position, cooperating means adapted to enclose and further fold the bag, a support upon which a tire casing is adapted to be mounted at one side of the folded curing bag, and means for pushing the curing bag from the enclosing and collapsing means and shifting it from a non-registering to a registering position where it is freed from said means and springs into nested relation with the tire casing.

8. In a device of the class described, in combination, means for folding an annular bag, means for supporting a previously shaped tire casing in a non-registering position with respect to the bag, and means for shifting the folded bag free of the folding means and into registration with the previously shaped casing on its supporting means.

9. In a device of the class described, in combination, means for folding a bag to reduce its girth, means at one side of the first mentioned means for supporting a previously shaped tire casing, means for shifting the folded bag from the first mentioned means and into registration with the previously shaped tire casing, and means cooperating with said last named means for spreading the beads of the casing apart whereby the bag may be automatically assembled in nested relation with the tire casing.

10. The method of assembling flexible annular cores in nested relation with previously shaped tire casings preparatory to vulcanization, which comprises, folding the core so that it may freely pass the beads of a shaped casing, sustaining a shaped casing at one side in proximity and parallel to the folded core, shifting the folded core past one bead of the casing into registration therewith while maintaining the parallel relationship of the folded core and casing and liberating the core to allow it to spring into nested relation with the casing.

11. The method of assembling flexible annular cores in nested relation with previously shaped tire casings preparatory to vulcanization, which comprises, folding the core so that it may pass the beads of a shaped casing, sustaining a shaped casing at one side in proximity and parallel to the folded core, shifting the folded core past one bead of the casing into registration therewith while maintaining the casing and folded core in parallel relation and liberating the core to allow it to spring into nested relation with the casing, and uniformly spreading the beads of the shaped casing apart before the core reaches the registering position to facilitate the nesting of the flexible core thereinto.

12. A device for inserting an airbag into a pneumatic tire casing comprising means for engaging the beads of the casing and means for moving them apart in substantially parallel relation, and means for inserting the airbag within the casing.

13. A device for inserting an airbag into a pneumatic tire casing comprising means for engaging the beads of the casing and moving them apart in substantially parallel relation, means for collapsing the airbag, and means for moving the collapsed bag to a position within the inner periphery of the tire casing.

14. A machine for inserting an airbag into a pneumatic tire casing comprising means for drawing apart the beads of the casing, means for collapsing the airbag, means for holding the bag temporarily collapsed and means for advancing the collapsed bag to a position within the inner periphery of the tire.

15. A method of inserting airbags in pneumatic tires which comprises moving the beads of the tires apart in substantially parallel relation, collapsing an airbag and inserting it within the inner periphery of the tire, releasing the airbag and allowing it to expand within the cavity of the tire.

Signed by me at Detroit, county of Wayne, State of Michigan, this 11th day of Aug., 1926.

ADRIAN OREN ABBOTT, Jr.